Aug. 8, 1950  J. F. WISNER  2,518,413
LOADING STRUCTURE FOR SHIPPING VEHICLES
Filed Dec. 30, 1947  3 Sheets-Sheet 3
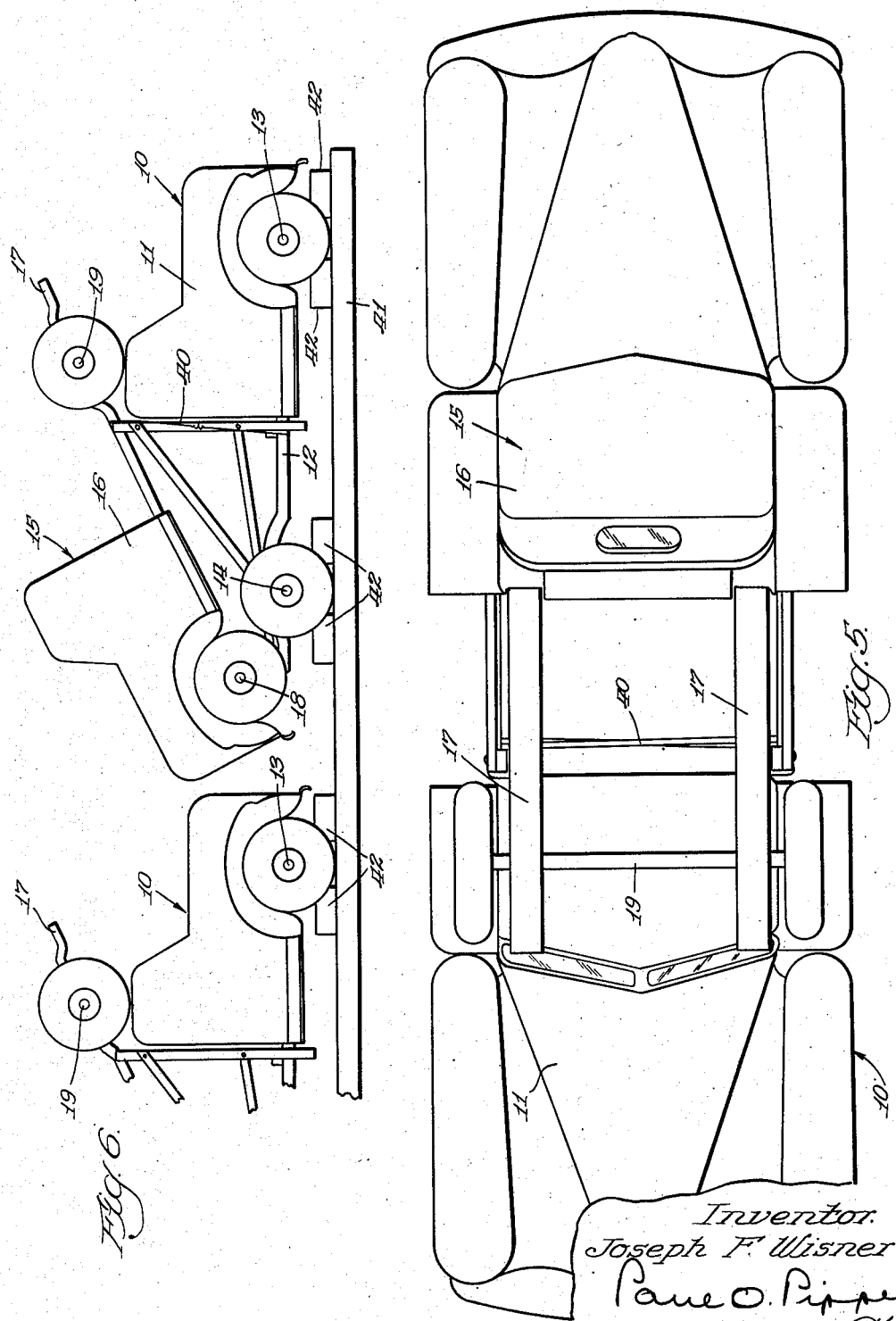
Inventor.
Joseph F. Wisner
Paul O. Pippel
Atty.

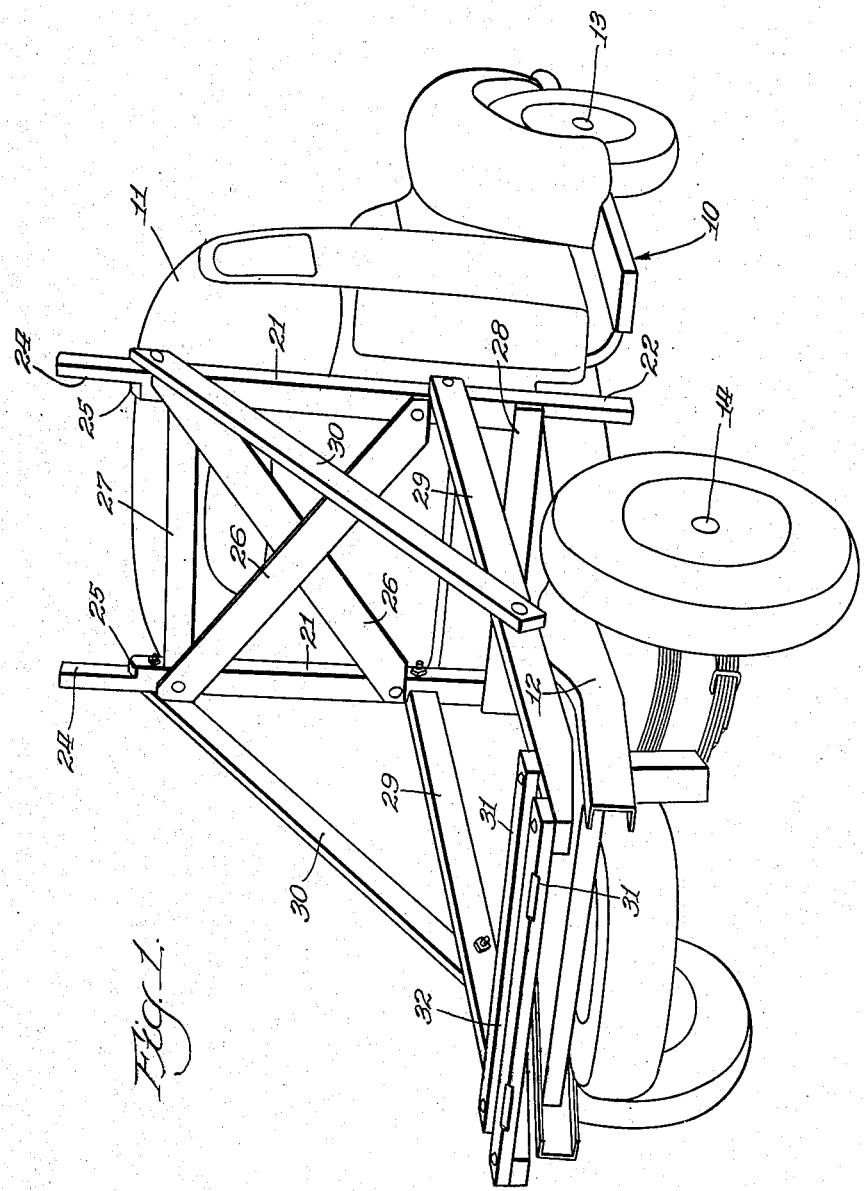

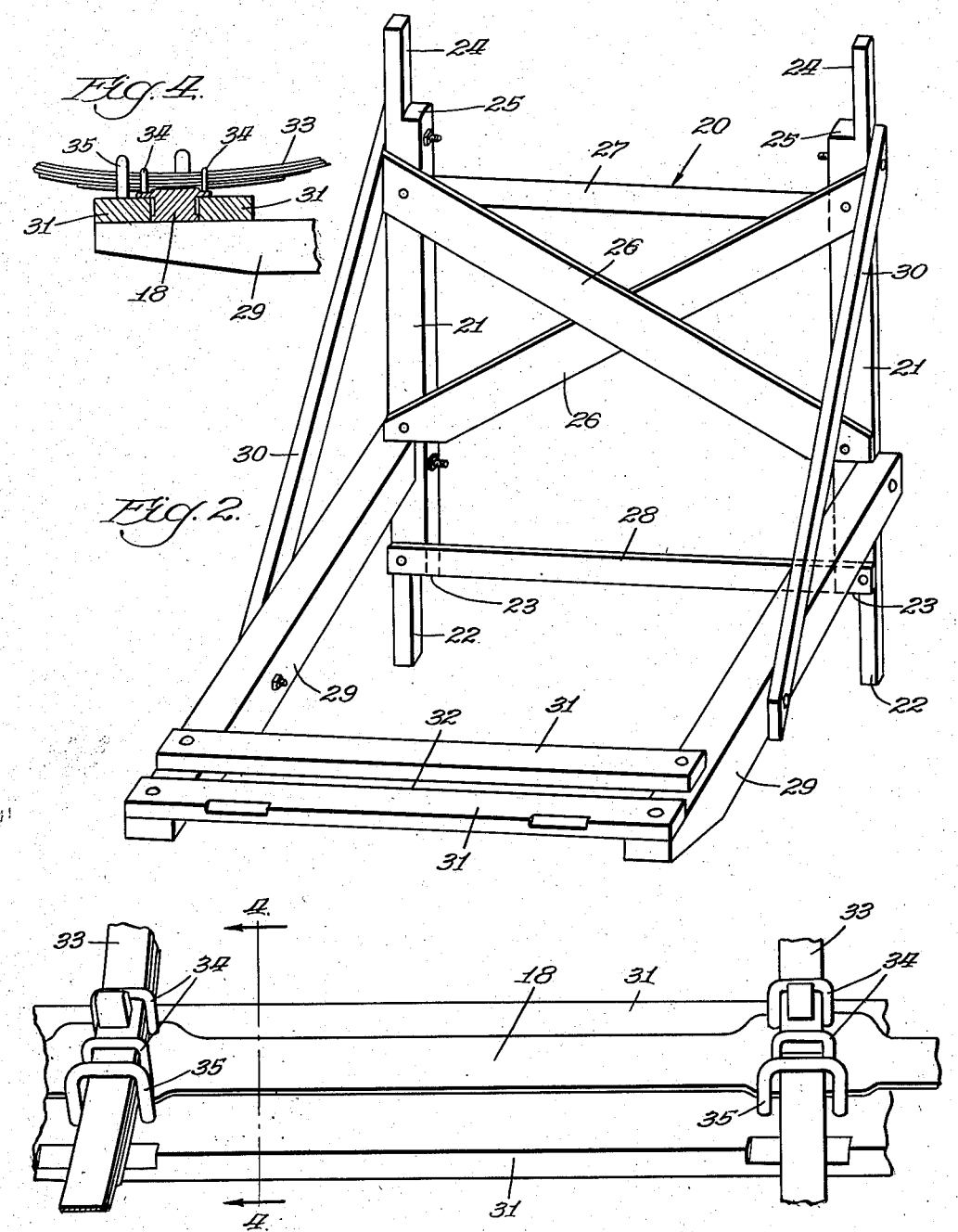

Patented Aug. 8, 1950

2,518,413

UNITED STATES PATENT OFFICE 2,518,413

LOADING STRUCTURE FOR SHIPPING VEHICLES

Joseph F. Wisner, Chicago, Ill., assignor to International Harvester Company, a corporation of New Jersey Application December 30, 1947, Serial No. 794,479

7 Claims. (Cl. 296—1)

This invention relates to a loading arrangement for shipping vehicles on freight cars or other commercial carriers.

The prime object of this invention is to provide an improved frame structure for supporting trucks or automobiles during shipment.

Another object is to provide a frame structure that can be quickly connected to the frame chassis of a truck, said frame structure being arranged to bodily support a second truck for shipment.

Still another object is to provide a frame structure which is readily attachable to the chassis of a first truck for supporting a second truck thereon, said frame structure being easily collapsible whereby the same may be re-used after said shipment.

A still further object is to provide an efficient and inexpensive loading arrangement for shipping trucks, said arrangement including a frame structure adapted to support a first truck upon the chassis of a second truck, thereby utilizing to a maximum degree the shipping space available in a freight car or other commercial carrier.

These and further objects will become more readily apparent upon a reading of the specification when examined in connection with the drawings.

In the drawings:

Fig. 1 is a view in perspective showing a truck containing a supporting frame mounted on the chassis of said truck.

Fig. 2 is a perspective view of a supporting frame proper.

Fig. 3 is a detail perspective view of a cradle portion of a supporting frame, said view showing an attaching means for connecting a portion of a truck chassis to a supporting member.

Fig. 4 is a sectional view taken along the line 4—4 of Fig. 3.

Fig. 5 is a plan view showing a truck mounted and supported completely on the truck chassis of another truck, said arrangement being for shipping purposes.

Fig. 6 is a diagrammatic view showing the shipping arrangement of a plurality of trucks on the frame of a freight car or other movable commercial carrier.

Referring particularly to Figs. 1, 5, and 6, a first truck is generally designated by the reference character 10. The truck 10, shown in this illustration, is of the pick-up type and includes an operator's cab or station 11. The truck is provided with a rear chassis consisting of a pair of rearwardly extending longitudinal channel members 12, said construction being of conventional design for truck bodies. The forward portion of the truck is supported on a conventional type of spring-supported front axle 13, and the rear chassis of the truck is supported on a spring-supported rear axle 14.

As best shown in Figs. 5 and 6, a second truck 15 is completely supported upon the chassis of the first truck 10. The truck 15 also includes an operator's cab or station 16 and a chassis consisting of a plurality of rearwardly extending longitudinal members 17. This truck is also supported on a spring-supported front axle 18 and a spring-supported rear axle 19.

Referring particularly to Figs. 1 and 2, a supporting frame is generally designated by the reference character 20. The supporting frame comprises a pair of side or vertical supporting members 21. The supporting members 21 are positioned immediately adjacent to and at the rear of the operator's station 11 of the first truck 10. Each vertical supporting member is provided at its lower point with a cutout thereby forming an overlapping extension 22. The overlapping extension 22 also provides a seat 23 which rests upon the upper surface of the rearwardly extending longitudinal channel members 12. As best shown in Fig. 1, the extensions 22 overlap the sides of the channel members thereby rigidly supporting the supporting frame 20 against lateral thrust. The upper end of each supporting member 21 is also cut out to provide an extension 24 and seats 25. The seats 25 are provided to support the rear longitudinal frame members 17 of the truck 15 as best shown in Fig. 6.

The vertical supporting members are connected by means of a pair of diagonal braces 26 which rigidly secure said members together. Cross braces 27 and 28 are also provided to further enhance the rigidity of the structure. A pair of rearwardly extending longitudinal members 29 are secured to the vertical supporting members 21. The rearwardly extending longitudinal members 29 rest upon and are supported by the channel members 12 of the first truck 10.

A pair of diagonally extending members 30 are connected at their upper ends to the vertical supporting members 21 and are connected at their lower ends to the longitudinal members 29 thus providing a rigid triangular frame connection. A pair of transversely extending members 31 have their ends connected to the rearwardly extending longitudinal members 29. The members 31 are spaced as indicated at 32 to provide an axle receiving supporting means or cradle.

As best shown in Figs. 3 and 4, front springs 33 of the second truck 10 are secured to the front axle 18 by means of U-bolts 34. This construction is conventional in the art and for the purpose of the present invention may be secured by any of the usual constructions. A U-clamp 35 encircles each spring 33, said U-clamp extending downwardly through the rearmost bracket 31 for securing the axle 18 and the springs within the cradle of the supporting frame 20 as shown in Fig. 3.

As shown in Fig. 6, a wire or steel band 40 is wrapped around the supporting members 21 and around the rearwardly extending longitudinal members 17 of the truck 15 for rigidly securing the rear portion of the chassis of said truck on the truck 10. In this loading arrangement the rear wheels of the truck are positioned above the operator's cab 11 and the front axle 18 of the truck 15 nestles within the cradle formed by the transversely extending members 31. In this manner the truck 15 is rigidly secured and completely bodily supported upon the truck 11. As best shown in Fig. 6, this arrangement permits the mounting, for shipping purposes, of these trucks in an efficient manner on the bottom 41 of a freight car or other commercial carrying vehicle. The trucks 10 may be suitably positioned on the bottom 41 by means of positioning blocks 42.

By the loading arrangement shown a maximum amount of efficiency is provided for the utilization of the space within the commercial carrier. The frame structure 20 is rigid and inexpensive to produce and after use it can be readily disassembled since the parts are all connected by means of removable fasteners or bolts of conventional design. Therefore the expense of shipping is greatly reduced, the loading of trucks for shipment is facilitated, and freight space is carefully utilized to a maximum degree. It is believed by applicant that the supporting arrangement disclosed provides the answer for efficient and economical shipment of truck vehicles of this and other types. The loading arrangement can be quickly arranged and the loading time in handling vehicles is greatly diminished. It should now be understood that a novel loading arrangement has been provided for shipping vehicles.

It is to be understood that changes and modifications may be made in this construction which do not depart from the spirit of the invention as disclosed nor the scope thereof as defined in the appended claims.

What is claimed is:

1. In a shipping structure for supporting a first and second vehicle on a mobile transport unit, each vehicle including an operator's station, rearwardly extending longitudinal chassis members and front and rear axles; comprising a supporting frame connected to the chassis members of the first vehicle and extending upwardly above the operator's station of the first vehicle, said frame including rearwardly extending longitudinal members supported on the chassis members of the first vehicle; an axle receiving cradle supported by said longitudinal members; securing means for connecting the chassis members of the second vehicle to said supporting frame whereby the rear portions of the said chassis members are supported above the operator's station of the first vehicle; and securing means for connecting the front axle of the second vehicle in said axle receiving cradle whereby the second vehicle is completely supported by the first vehicle.

2. In a shipping structure for mounting a first and second vehicle on a movable transport unit, each vehicle including an operator's cab, rearwardly extending longitudinal chassis members and front and rear spring-supported axles; comprising a frame carried by the first vehicle; said frame including a pair of transversely spaced side supports, each support being connected to the chassis member adjacent the operator's cab and extending upwardly above the cab; transversely spaced longitudinal members extending in substantially parallel relation to said chassis members and being supported thereon; transversely extending brackets connecting said longitudinal members, said brackets being horizontally spaced to provide an axle receiving cradle, means for supporting the rear portion of the chassis members of said second vehicle on said side supports whereby the rear axle of said second vehicle is positioned above the cab of the first vehicle; and securing means for connecting the spring-supported front axle of said second vehicle in the cradle formed by said transversely extending brackets.

3. In a shipping structure for mounting a first and second vehicle on a movable transport unit, each vehicle including an operator's cab, rearwardly extending longitudinal chassis members and front and rear spring-supported axles; comprising a frame carried by the first vehicle; said frame including a pair of transversely spaced side supports, each support being connected to the chassis member adjacent the operator's cab and extending upwardly above said cab; transversely spaced longitudinal members extending in substantially parallel relation to said chassis members and being supported thereon; transversely extending brackets connecting said longitudinal members, said brackets being horizontally spaced to provide an axle receiving cradle, means for supporting the rear portion of the chassis members of said second vehicle on said side supports whereby the rear axle of said second vehicle is positioned above the cab of the first vehicle, said side supports including extensions engaging edges of said chassis member to secure the same against lateral thrust; and securing means for connecting the spring-supported front axle of said second vehicle in the cradle formed by said transversely extending brackets.

4. In a shipping structure for mounting a first and second vehicle, each vehicle including an operator's cab, rearwardly extending longitudinal chassis members and front and rear spring-supported axles; comprising a frame carried by the first vehicle; said frame including a pair of transversely spaced side supports, each support being connected to the chassis member adjacent the operator's cab and extending upwardly above said cab; transversely spaced longitudinal members extending in substantially parallel relation to said chassis members and being supported thereon; brace members connected to said side supports, said brace members extending angularly downwardly and being connected to said longitudinal members; transversely extending brackets connecting said longitudinal members, said brackets being horizontally spaced to provide an axle receiving cradle, means for supporting the rear portion of the chassis members of said second vehicle on said side supports whereby the rear axle of said second vehicle is positioned above the cab of the first vehicle, said side supports including extensions engaging edges of said chassis member to secure the same against lateral thrust; and securing means for connecting the spring-supported front axle of said second vehicle in the cradle formed by said transversely extending brackets.

5. In a shipping structure for mounting a first and second vehicle, each vehicle including an operator's cab, rearwardly extending longitudinal chassis members and front and rear spring-supported axles; comprising a frame carried by the first vehicle; said frame including a pair of transversely spaced side supports, each support being connected to the chassis member adjacent the operator's cab and extending upwardly above the cab; diagonally extending braces connecting said side supports; transversely spaced longitudinal members extending in substantially parallel relation to said chassis members and being supported thereon; brace members connected to the upper ends of said side supports, said brace members extending angularly downwardly and being connected to said longitudinal members; transversely extending brackets connecting said longitudinal members, said brackets being horizontally spaced to provide an axle receiving cradle, means for supporting the rear portion of the chassis members of said second vehicle on said side supports whereby the rear axle of said second vehicle is positioned above the cab of the first vehicle, said side supports including extensions engaging edges of said chassis member to secure the same against lateral thrust; and means for connecting the spring-supported front axle of said second vehicle in the cradle formed by said transversely extending brackets.

6. In a shipping structure for mounting a first and second vehicle on a movable transport unit, each vehicle including an operator's cab, rearwardly extending longitudinal chassis members and front and rear spring-supported axles; comprising a frame carried by the first vehicle; said frame including a pair of transversely spaced side supports, each support being connected to the chassis member adjacent the operator's cab and extending upwardly above the cab; diagonally extending braces connecting said side supports; transversely spaced longitudinal members extending in substantially parallel relation to said chassis members and being supported thereon; brace members connected to the upper ends of said side supports, said brace members extending angularly downwardly and being connected to said longitudinal members; transversely extending brackets connecting said longitudinal members, said brackets being horizontally spaced to provide an axle receiving cradle, means for supporting the rear portion of the chassis members of the second vehicle on said side supports whereby the rear axle of said second vehicle is positioned above the cab of the first vehicle, said side supports including extensions engaging edges of said chassis member to secure the same against lateral thrust; and means for connecting the spring-supported front axle of the second vehicle in the cradle formed by said transversely extending brackets, said means including U-shaped securing members connected to the brackets and to portions of the spring supported front axle whereby said second vehicle is mounted on said first vehicle.

7. In a shipping structure for supporting a first and second vehicle for transportation, each vehicle including an operator's station, rearwardly extending longitudinal chassis members and front and rear axles; a supporting frame supported by the chassis members of the first vehicle, said frame including side supports extending vertically adjacent to and above the operator's station of said first vehicle; securing means for connecting the chassis members of the second vehicle to said side supports whereby the rear axle of the second vehicle is positioned above the operator's station of the first vehicle; an axle supporting member carried on the chassis members of said first vehicle, said supporting member being positioned adjacent the rear axle of said first vehicle; and securing means for supporting the front axle of said second vehicle on said supporting member immediately adjacent the rear axle of said first vehicle whereby the chassis members of the second vehicle extend upwardly in inclined relation above the operator's station of the first vehicle and said second vehicle is completely supported by said first vehicle.

JOSEPH F. WISNER.

REFERENCES CITED

The following references are of record in the file of this patent:

UNITED STATES PATENTS

| Number | Name | Date |
| --- | --- | --- |
| 1,280,512 | Macomber | Oct. 1, 1918 |
| 2,108,968 | Judd | Feb. 22, 1938 |